United States Patent
Jain et al.

(10) Patent No.: US 10,591,965 B2
(45) Date of Patent: Mar. 17, 2020

(54) SYSTEM AND METHOD FOR CONTEXT-AWARE THERMAL MANAGEMENT AND WORKLOAD SCHEDULING IN A PORTABLE COMPUTING DEVICE

(71) Applicant: QUALCOMM INCORPORATED, San Diego, CA (US)

(72) Inventors: Palkesh Jain, Bangalore (IN); Ronald Alton, Oceanside, CA (US); Jon Anderson, Boulder, CO (US); Mehdi Saeidi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 160 days.

(21) Appl. No.: 15/411,868

(22) Filed: Jan. 20, 2017

(65) Prior Publication Data

US 2018/0210522 A1    Jul. 26, 2018

(51) Int. Cl.
*G06F 1/20* (2006.01)
*G06F 9/48* (2006.01)
*G06F 1/3206* (2019.01)

(52) U.S. Cl.
CPC .............. *G06F 1/206* (2013.01); *G06F 1/203* (2013.01); *G06F 1/3206* (2013.01); *G06F 9/4893* (2013.01); *Y02D 10/16* (2018.01)

(58) Field of Classification Search
None
See application file for complete search history.

(56) References Cited

U.S. PATENT DOCUMENTS

| | | |
|---|---|---|
| 8,963,845 B2 | 2/2015 | Alameh et al. |
| 2010/0082299 A1 | 4/2010 | Dhanekula et al. |
| 2010/0259889 A1 | 10/2010 | Chen et al. |
| 2013/0090888 A1* | 4/2013 | Anderson ............... G06F 1/203 702/130 |
| 2014/0236380 A1 | 8/2014 | Alton et al. |
| 2014/0351612 A1 | 11/2014 | Sun et al. |
| 2015/0227391 A1* | 8/2015 | Paul ..................... G06F 1/3206 718/102 |
| 2015/0286262 A1* | 10/2015 | Park ................... G05D 23/1917 713/320 |
| 2015/0333960 A1 | 11/2015 | He et al. |
| 2015/0346809 A1* | 12/2015 | Kumar ................. G06F 9/4893 713/323 |
| 2015/0347203 A1 | 12/2015 | Yang et al. |
| 2016/0048347 A1 | 2/2016 | Rangarajan et al. |

(Continued)

OTHER PUBLICATIONS

International Search Report and Written Opinion—PCT/US2018/014192—ISA/EPO—dated Jun. 14, 2018 (163770WO).

*Primary Examiner* — Eric C Wai
*Assistant Examiner* — Zujia Xu
(74) *Attorney, Agent, or Firm* — Smith Tempel Blaha LLC

(57) ABSTRACT

Various embodiments of methods and systems context-aware thermal management in a portable computing device ("PCD") are disclosed. Notably, the environmental context to which a PCD is subjected may have significant impact on the PCD's thermal energy dissipation efficiency. Embodiments of the solution seek to leverage knowledge of a PCD's environmental context to modify or adjust thermal policy parameters applied within a PCD in response to a thermal event within the PCD.

30 Claims, 6 Drawing Sheets

(56) References Cited

U.S. PATENT DOCUMENTS

2016/0091938 A1* 3/2016 Edwards ................. G06F 1/206
700/300
2018/0011521 A1* 1/2018 Ingalls .................... G06F 1/206

* cited by examiner

FIG. 3

Exemplary Context Database Records

| Context | Variable Set | | | Tsens Map | Designation |
| --- | --- | --- | --- | --- | --- |
| | Tamb | Orientation | Contact | | |
| Baseline | 25 °C | Horizontal | None | Baseline | Baseline |
| Discovered #1 | 40 °C | Tilted | Insulator | Map #1 | Adverse |
| ... | ... | ... | ... | ... | ... |
| Discovered #n | 20 °C | Vertical | Conductor | Map #n | Benefitting |

SYSTEM AND METHOD FOR CONTEXT-AWARE THERMAL MANAGEMENT AND WORKLOAD SCHEDULING IN A PORTABLE COMPUTING DEVICE

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, as are often found in larger computing devices such as laptop and desktop computers. Instead of using fans, PCDs may rely on strategic placement of passive cooling devices and/or spatial arrangement of electronic packaging so that two or more active and heat producing components are not positioned proximally to one another. In conjunction with clever spatial arrangements and/or strategic placement of passive cooling components, PCD designers also rely on various temperature sensors embedded on the PCD chip to monitor the dissipation of thermal energy. Measurements taken by the embedded temperature sensors may be used to trigger application of thermal management techniques, as would be understood by one of ordinary skill in the art.

In this way, current systems and methods of thermal management in a PCD rely on internal temperature measurements to exceed predetermined thermal thresholds in order to trigger a thermal mitigation decision. Once the need for thermal mitigation is triggered by a temperature measurement that has exceeded a thermal threshold, current systems and methods use mathematical models to determine the appropriate thermal mitigation decision. The thermal mitigation decision is then applied immediately so that thermal energy generation is mitigated. Current systems and methods for thermal mitigation may continue in their application of mitigation decisions until the temperature measurement is reduced below the threshold and the alert cleared, at the expense of quality of service ("QoS") delivered to the user.

Because current systems and methods for thermal mitigation are predicated upon assumptions about the external environment to which the PCD is exposed, i.e. the "context" of the PCD, current systems and methods are unlikely to optimize QoS when managing a thermal event within the PCD. Therefore, what is needed in the art is a system and method for context-aware thermal management and workload scheduling in a PCD. More specifically, what is needed in the art is a system and method that leverages information about the context of the PCD to adjust thermal mitigation policies and optimize QoS to a user.

SUMMARY OF THE DISCLOSURE

Various embodiments of methods and systems for context-aware thermal management in a portable computing device ("PCD") are disclosed. Notably, the environmental context to which a PCD is subjected may have significant impact on the PCD's thermal energy dissipation efficiency. Embodiments of the solution seek to leverage knowledge of a PCD's context to modify or adjust thermal policy parameters applied within a PCD in response to a thermal event within the PCD.

An exemplary embodiment defines a context variable set to represent an external environment to which the PCD is exposed and then establishes baseline values for the context variable set. The baseline values are associated with a baseline context. Subsequently, a set of context sensors are monitored to recognize the baseline values. The context sensors may generate readings quantifying, for example, one or more of a physical orientation of the PCD, an ambient temperature, a humidity level, and contact with a surface external to the PCD.

In response to recognizing the baseline values, the exemplary embodiment executes a known workload having a known power envelope in order to generate a baseline thermal map from temperature readings monitored during execution of the known workload. Once the baseline thermal map is generated, it is stored in a context database in association with the baseline values for the context variable set. Next, the exemplary embodiment continues to monitor the set of context sensors to recognize discovered values for the context variable set that are different from the baseline values. The discovered values represent an environmental context that is different from the baseline context and, as such, may indicate that the thermal energy dissipation efficiency of the PCD may be different than when exposed to the baseline values of the context parameters.

In response to recognizing the discovered values the exemplary embodiment executes the known workload again and generates a discovered thermal map from temperature readings monitored during execution of the known workload. The discovered thermal map is compared with the baseline thermal map to determine a designation of the discovered values for the context variable set as representing either a "beneficial" context or an "adverse" context relative to the baseline values for the context variable set. The discovered values for the context variable set are stored in association with the determined designation. The exemplary method continues to monitor the context sensors to recognize a next occurrence of the previously discovered values and, in response to recognizing the next occurrence of the discovered values, queries the database to determine the designation associated with the discovered values. Based on the designation (either "beneficial" or "adverse"), a thermal management policy may be adjusted or modified to optimize QoS in view of the active environmental context.

Modifying the thermal management policy may comprise adjusting a workload allocation to one or more processing components, adjusting a maximum frequency to one or more processing components, adjusting a power supply to one or more processing components, etc.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 3 is a chart illustrating exemplary contexts of a PCD that have been discovered and recorded by a embodiment of the solution;

DETAILED DESCRIPTION

Figure 1:
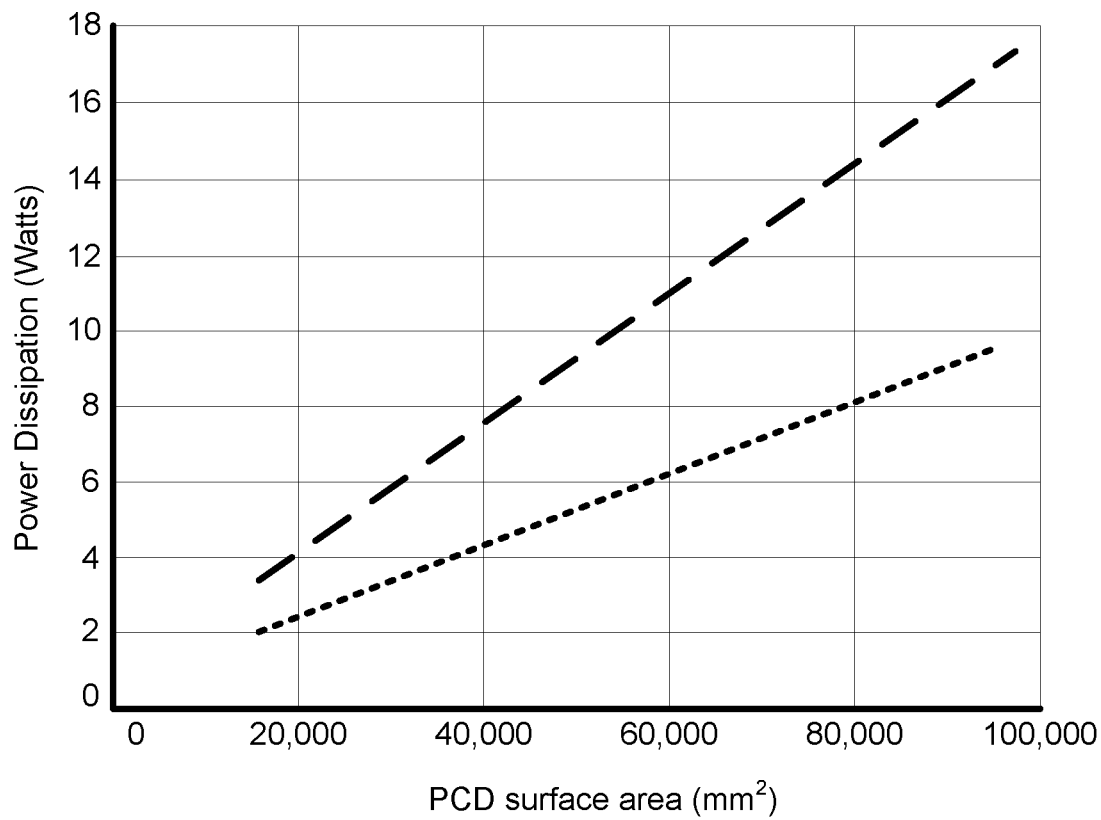
FIG. 1 is a graph illustrating power dissipation efficiencies of PCDs in view of their physical orientation context.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein may also include files that are not executable in nature, such as documents that may need to be opened or other data files that need to be accessed.

As used in this description, the terms "component," "database," "module," "system," "thermal energy generating component," "processing component," "thermal aggressor" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD. That is, although many of the embodiments are described in the context of a processing component, it is envisioned that context-aware thermal management policies may be applied to any functional component within a PCD including, but not limited to, a modem, a camera, a wireless network interface controller ("WNIC"), a display, a video encoder, a peripheral device, a battery, etc.

Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal footprint," "thermal dynamics," "thermal processing load," "thermal map," "Tsens map" and the like are indicative of workload burdens that may be running on a specific processor and/or across an entire chip, one of ordinary skill in the art will acknowledge that use of these "thermal" terms in the present disclosure may be related to process load distributions, workload burdens and power consumption.

In this description, it will be understood that the terms "thermal" and "thermal energy" may be used in association with a device or component capable of generating or dissipating energy that can be measured in units of "temperature." Moreover, it will be understood that the terms "thermal map," "thermal dynamics" and the like may be used within the context of the thermal relationship between two or more components within a PCD and may be quantifiable in units of temperature. Consequently, it will further be understood that the term "temperature," with reference to some standard value, envisions any measurement that may be indicative of the relative warmth, or absence of heat, of a "thermal energy" generating device or the thermal relationship between components. For example, the "temperature" of two components is the same when the two components are in "thermal" equilibrium.

In this description, the terms "thermal mitigation technique(s)," "thermal policies," "thermal management," "thermal mitigation measure(s)," "throttling to a performance level," "thermal mitigation decision" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the terms "performance setting," "bin setting," "power level" and the like are used interchangeably to reference the power level supplied to a thermally aggressive processing device or devices in a PCD.

In this description, "context variable" is meant to refer to any component or measured condition external to the PCD that affects thermal energy dissipation in the PCD. As such, a context variable, or combination of context variables, may be associated with either an increase in thermal energy dissipation efficiency or a decrease in thermal energy dissipation efficiency, as compared to some expected or baseline thermal energy dissipation rate. Context variables are envisioned to include, but are not limited to including, ambient temperature, physical orientation of the PCD, contact with a conducting or insulating surface (e.g., a cover component, a table, etc.), humidity, etc. Changes in any one or more context variables may affect a PCD's ability to efficiently react to a thermal event internal to the PCD.

Managing thermal energy generation in a PCD, without unnecessarily impacting quality of service ("QoS"), may be accomplished by leveraging one or more sensor measurements or data inputs that establish an environmental context of the PCD. Depending on whether the context of the PCD is "adverse" or "benefitting" when compared to a baseline context initially assumed by PCD designers, thermal management and workload scheduling techniques may be adjusted to optimize the QoS experience of a user.

As one of ordinary skill in the art would understand, when a thermal event internal to a PCD is detected (such as an increase in a core junction temperature beyond a predetermined threshold), thermal mitigation measures may be taken to reduce thermal energy generation by thermally aggressive components within the PCD. Notably, the thermal thresholds that define a thermal event, and the mitigation measures that will be taken in response to the thermal event, are inevitably predetermined in view of environmental context assumptions (e.g., a 25° C. ambient temperature and a horizontal PCD physical orientation). As such, changes in the environmental contexts relative to the assumptions may have a significant impact on the resulting efficiency of the mitigation measures taken in response to a thermal event.

For example, when the actual context parameters are more favorable to thermal energy dissipation than the assumed context parameters, thermal mitigation measures taken in view of the assumed context parameters will result in an underperforming QoS level due to an unnecessary impact to processing performance. Similarly, when the actual context parameters are less favorable to thermal energy dissipation than the assumed context parameters, thermal mitigation measures taken in view of the assumed context parameters will result in an underperforming QoS level due to an inadequate adjustment to processing performance that leads to further detrimental thermal energy generation and more extreme thermal mitigation responses.

Notably, although exemplary embodiments of context-aware thermal management and workload scheduling methods are described herein in the context of a central processing unit ("CPU"), application of context-aware methodologies are not limited to a CPU. It is envisioned that context-aware methods may be extended to any combination of thermal aggressors and context parameter variables that may exist according to a given use case for a PCD. For ease of explanation, some of the illustrations in this specification primarily include a CPU as the representative thermal aggressor within a PCD and a set of just three context variables which may be used in combination to define an environmental context to which a PCD may be subjected; however, it will be understood that any number of thermal aggressors may be the subject of a context-aware policy that considers a combination of any number of context variables.

FIG. 1 is a graph illustrating power dissipation efficiencies of PCDs in view of their physical orientation context. As can be seen in the graph, the y-axis represents power dissipation as measured in watts (i.e., a thermal energy dissipation rate) and the x-axis represents the surface area of a given PCD. As one of ordinary skill in the art would recognize, a larger surface area generally provides for more efficient dissipation of thermal energy. Therefore, the lower end of the plots might represent a typical PCD taking the form of a cellular telephone while the upper end of the plots might represent a typical PCD taking the form of a tablet or the like.

The physical orientation of PCD in space may have a significant impact on a given PCD's ability to dissipate thermal energy. For example, a horizontal orientation of a given PCD such that its downward facing surface is associated with an adiabatic chip within may be a less than ideal context for thermal energy generation. For exemplary purposes, the lower plot (shown with "small" dashes) represents such a horizontal context. Likewise, a vertical orientation of the same given PCD may be more conducive to thermal energy dissipation. For exemplary purposes, the upper plot (shown with "large" dashes) represents such a vertical context.

As can be understood from the FIG. 1 graph, recognition of the physical orientation of a given PCD may be advantageously leveraged, perhaps along with other context parameters, to modify thermal mitigation policies designed to react to thermal events within the given PCD. Put simply, if an exemplary PCD represented in the FIG. 1 illustration is in a vertical position, embodiments of the solution may recognize such and modify thermal policies to be less aggressive in taking thermal mitigation measures relative to some baseline context. Moreover, if an exemplary PCD represented in the FIG. 1 illustration is in a horizontal position, embodiments of the solution may recognize such and modify thermal policies to be more aggressive in taking thermal mitigation measures relative to some baseline context.

Figure 2:
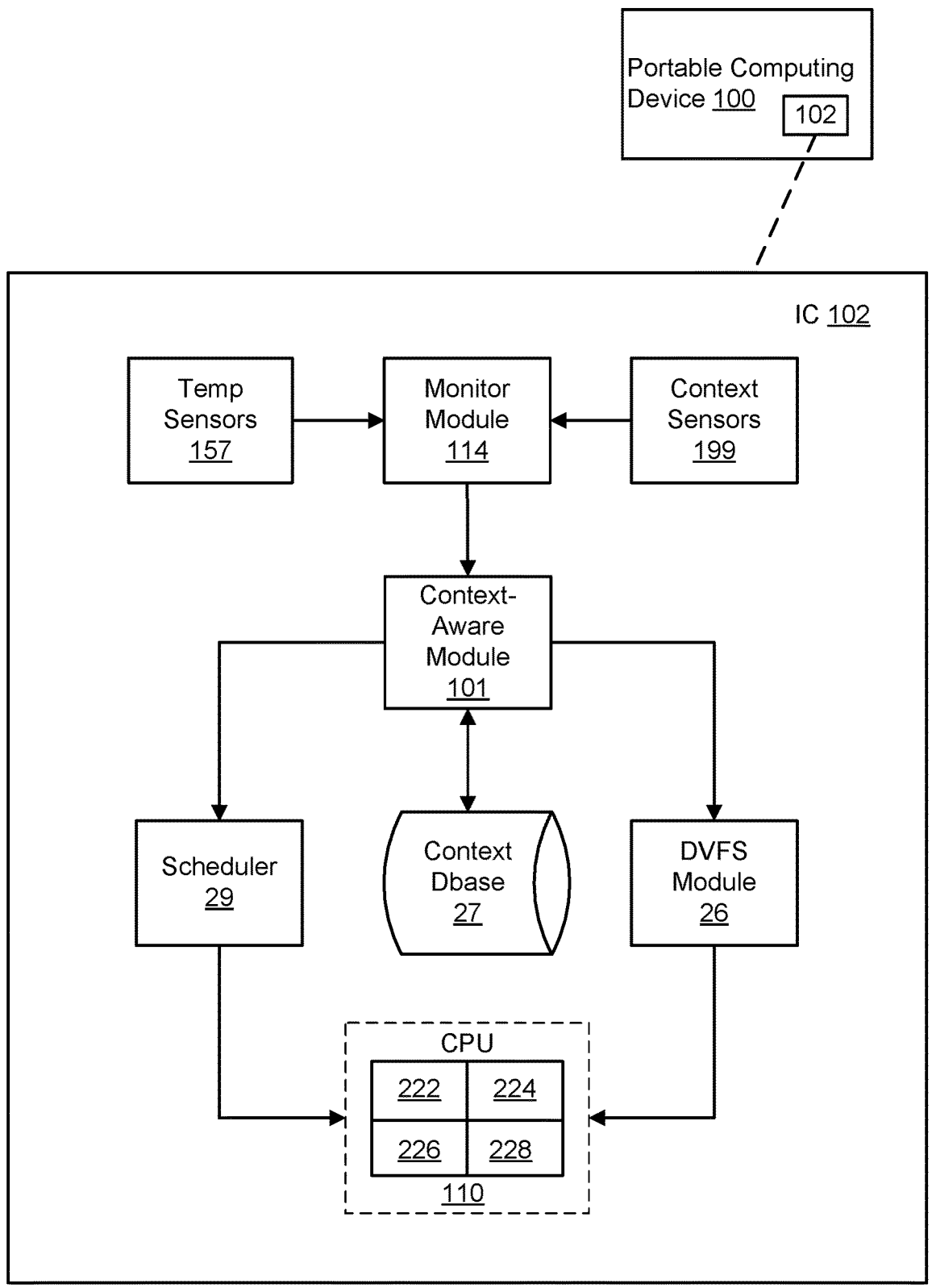
FIG. 2 is a functional block diagram illustrating an embodiment of an on-chip system for implementing context-aware thermal management and workload scheduling methodologies in a PCD.

FIG. 2 is a functional block diagram illustrating an embodiment of an on-chip system 102 for implementing context-aware thermal management and workload scheduling methodologies in a PCD 100. A monitor module 114 may be configured to monitor and receive measurements from one or more temperature sensors 157 and context sensors 199. The temperature sensors 157 may be positioned around and within the PCD 100 to measure thermal energy levels associated with one or more of, but not limited to, a junction temperature, an outer shell or "skin" temperature, a PoP memory temperature, a power supply temperature, etc. The context sensors 199 may be configured to measure and generate readings that collectively define an environmental context of the PCD 100. For example, context sensors 199 may be configured to generate readings indicative of, but not limited to, environmental humidity, ambient temperature to which the PCD 100 is exposed, physical orientation of the PCD 100, contact with a surface external to the PCD shell (e.g., a protective cover), etc. Notably, the context variables measured by the context sensors may impact the ability of the PCD 100 to dissipate thermal energy.

The monitor module 114 is in communication with a context-aware module 101. The context-aware module 101 receives relevant readings from the monitor module and leverages them to execute context-aware thermal management and workload scheduling techniques. Initially, a baseline environmental context may be established and recognized by the monitor module 114 and/or context-aware module 101. Understanding that the PCD 100 is performing subject to a baseline context, the context-aware module 101 may cause execution of a known workload associated with a known power envelope. During execution of the known workload, the monitor module 114 may take thermal readings from some subset of the temperature sensors 157 so that the context-aware module 101 may generate a thermal map (i.e., a "Tsens" map). The thermal map represents a baseline thermal performance of the PCD 100 and is stored in the context database 27 in association with the baseline context variables measured by the context sensors 199. In this way, the system 102 may establish an expected thermal performance when the PCD 100 is operating according to the known workload and subject to the baseline context parameters. Baseline mitigation policies may be established in view of these baseline context parameters.

Next, the monitor module 114 and/or context-aware module 101 may recognize a change in the context variable readings relative to the baseline variable readings and, in response, execute the known workload. Notably, because the change in context may impact the efficiency at which the PCD 100 dissipates thermal energy, execution of the known workload may be used to generate a new thermal map based on readings from the temperature sensors 157. The context-aware module 101 may subsequently compare the new thermal map to the baseline thermal map and determine whether the active context variable readings (which differ from the baseline context variable readings) represent a context which is more ("beneficial") or less ("adverse") efficient for dissipation of thermal energy relative to the baseline context. Subsequently, the context-aware module 101 may store the new thermal energy map and/or the determined designation ("beneficial" or "adverse") in the context database 27 along with the newly discovered/recognized context variable readings.

In operation, when the monitor module 114 working with the context-aware module 101 recognizes a combination of context variable readings previously tested against the known workload, the context-aware module 101 may query the context database 27 to determine whether such previously discovered context is "beneficial" or "adverse" for thermal energy generation relative to the baseline context. If "beneficial" the context-aware module 101 may work with the scheduler 29 to allocate larger than normal workloads to the CPU 110 and/or the dynamic voltage and frequency scaling ("DVFS") module 26 to increase a maximum frequency ("Fmax") supplied to the CPU 110, knowing that the active context to which the PCD 100 is exposed provides for improved thermal energy dissipation relative to a baseline context for which thermal mitigation policies may have been configured. Similarly, if the active and previously discovered context is "adverse," the context-aware module 101 may work with the scheduler 29 to allocate smaller than normal workloads (or strategically reallocate workloads) to the CPU 110 and/or the DVFS module 26 to decrease a maximum frequency ("Fmax") supplied to the CPU 110, knowing that the active context to which the PCD 100 is exposed provides for reduced efficiency in thermal energy dissipation relative to a baseline context for which thermal mitigation policies may have been configured. In these ways, embodiments of the solution may leverage information indicative of an environmental context to adjust thermal mitigation policies such that QoS is optimized.

FIG. 3 is a chart illustrating exemplary contexts of a PCD that have been discovered and recorded in the context database 27 by an embodiment of the solution. As previously noted, the discovered contexts may be later leveraged by embodiments of the solution to modify or adjust thermal management policies reacting to thermal events within the PCD 100.

Turning to the FIG. 3 chart, a baseline context may have been defined as a set of context variables comprising ambient temperature ("Tamb"), orientation of the PCD 100 as may be measured and quantified by a context sensor in the form of a gyroscope or 3-axis accelerometer for example, and contact with a surface that affects thermal energy dissipation such as a phone cover. The baseline readings for the context variables, as illustrated in the exemplary FIG. 3 chart, are 25° C. for Tamb, "horizontal" for orientation, and "none" for surface contact. With the context variable readings indicating the baseline context, the context-aware module 101 would expect the PCD 100 to thermally perform consistent with the baseline Tsens map.

In operation, the context-aware module 101 may have discovered combinations of context variable readings that differ from the baseline variable readings and, in response, executed the known workload, generated Tsens maps unique to each discovered combination, and determined whether each discovered combination was "beneficial" or "adverse." For each discovered combination of context variable readings, the context-aware module 101 may have stored the combination along with its Tsens map and/or designation in the context database 27, as can be understood from the exemplary FIG. 3 chart.

Figure 4:
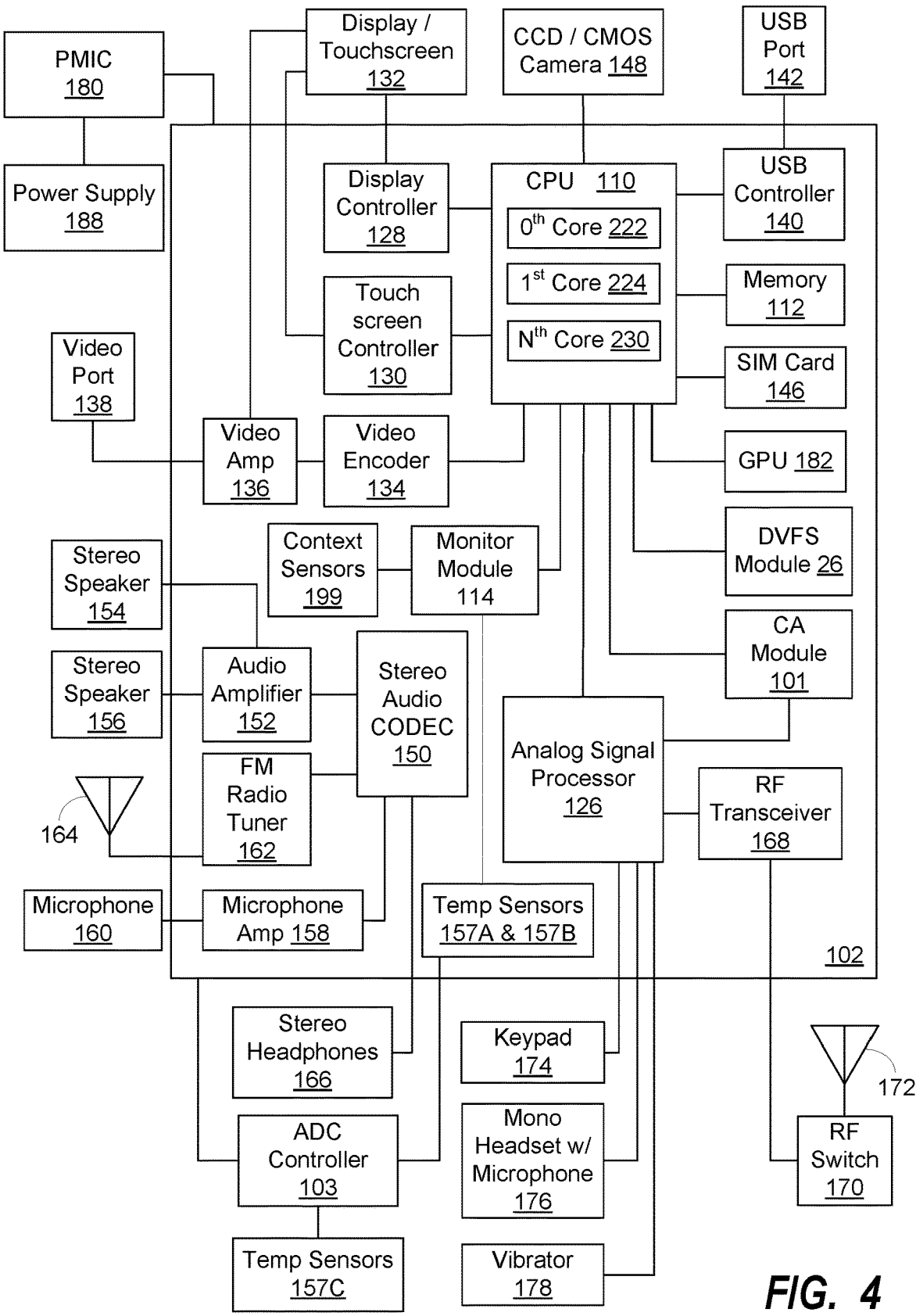
FIG. 4 is a functional block diagram illustrating an exemplary, non-limiting aspect of the PCD of FIG. 2 in the form of a wireless telephone for implementing methods and systems for context-aware thermal management and workload scheduling.

FIG. 4 is a functional block diagram illustrating an exemplary, non-limiting aspect of the PCD of FIG. 2 in the form of a wireless telephone for implementing methods and systems for context-aware thermal management and workload scheduling. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the dynamic voltage and frequency scaling ("DVFS") module 26 may be responsible for implementing throttling techniques to individual processing components, such as cores 222, 224, 230 in an incremental fashion to help a PCD 100 optimize its power level and maintain a high level of functionality without detrimentally exceeding certain temperature thresholds.

The monitor module 114 communicates with multiple operational sensors (e.g., thermal sensors 157A, 157B and context sensors 199) distributed throughout the on-chip system 102 and with the CPU 110 of the PCD 100 as well as with the context-aware module 101. The monitor module 114 may also monitor "off-chip" sensors 157C for temperature readings associated with a touch temperature of PCD 100 and/or any "off chip" context sensors 199. The context-aware module 101 may work with the monitor module 114 to establish a baseline context and baseline thermal performance, discover new contexts as indicated by combinations of context sensor readings and establish thermal performance expectations in association with the discovered contexts, and adjust thermal mitigation policies in view of active contexts previously discovered.

As illustrated in FIG. 4, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 4, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 4, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 4, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 4 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 4 further indicates that a radio frequency ("RF") transceiver 168 may be coupled to the analog signal processor 126. An RF switch 170 may be coupled to the RF transceiver 168 and an RF antenna 172. As shown in FIG. 4, a keypad 174 may be coupled to the analog signal processor 126. Also, a mono headset with a microphone 176 may be coupled to the analog signal processor 126. Further, a vibrator device 178 may be coupled to the analog signal processor 126. FIG. 4 also shows that a power supply 188, for example a battery, is coupled to the on-chip system 102 through PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A, 157B, one or more external, off-chip thermal sensors 157C and/or one or more context sensors 199. The on-chip thermal sensors 157 may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157 may comprise one or more thermistors. The thermal sensors 157 may produce a voltage drop that is converted to digital signals with an analog-to-digital converter ("ADC") controller 103. However, other types of thermal sensors 157A, 157B, 157C may be employed without departing from the scope of the invention. The context sensors 199 may comprise sensors configured for reading and quantifying context variables such as, but not limited to, humidity sensors, ambient temperature sensors, orientation sensors, surface contact sensors, etc. Notably, depending on the embodiment of the solution, one or more context variables may be represented by a fixed input designated by a user, as opposed to being represented by a variable reading from a sensor 199.

The DVFS module(s) 26, scheduler 29 (not shown in FIG. 4) and context-aware module(s) 101 may comprise software which is executed by the CPU 110. However, the DVFS module(s) 26, scheduler 29 and context-aware module(s) 101 may also be formed from hardware and/or firmware without departing from the scope of the invention. The context-aware module(s) 101 in conjunction with the DVFS module(s) 26 and/or scheduler 29 may be responsible for applying throttling policies or allocating workloads in such ways that may help a PCD 100 avoid thermal degradation while maintaining a high level of functionality and user experience.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more context-aware module(s) 101, scheduler 29, and DVFS module(s) 26. These instructions that form the module(s) 101, 29, and 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 5:
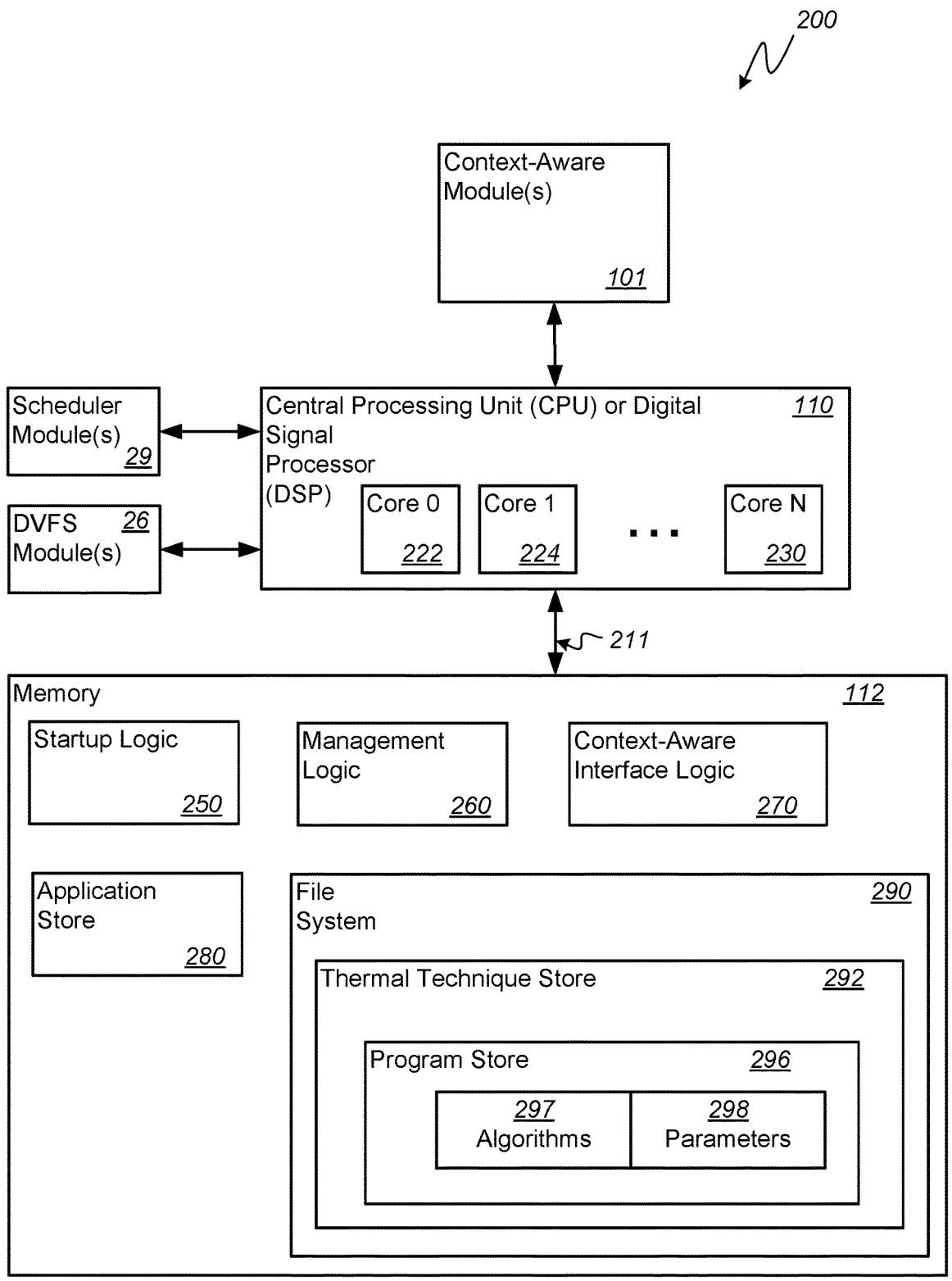
FIG. 5 is a schematic diagram illustrating an exemplary software architecture of the PCD of FIG. 4 for context-aware thermal management and workload scheduling.

FIG. 5 is a schematic diagram illustrating an exemplary software architecture 200 of the PCD of FIG. 4 for context-aware thermal management and workload scheduling. Any number of algorithms may form or be part of at least one thermal management policy that may be adjusted, modified or applied by the context-aware module 101 when certain context variable reading combinations are recognized, however, in a preferred embodiment the context-aware module 101 works with the DVFS module 26 and/or scheduler 29 to adjust workloads or incrementally apply voltage and frequency scaling policies to individual thermal aggressors in chip 102 including, but not limited to, cores 222, 224 and 230. The workload adjustments and/or incremental scaling efforts may be in response to the context-aware module 101 having identified active context variable readings which are consistent with a previously discovered and quantified context variable reading combination.

As illustrated in FIG. 5, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs may be distributed for processing across two or more of the available cores.

The CPU 110 may receive commands from the context-aware module(s) 101 and/or DVFS module(s) 26 and/or scheduler 29 that may comprise software and/or hardware. If embodied as software, the module(s) 101, 26, 29 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the N$^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 5, it should be noted that one or more of startup logic 250, management logic 260, context-aware interface logic 270, applications in application store 280 and portions of the file system 290 may be stored on any computer-readable medium or device for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the context-aware interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 may comprise a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for context-aware managing or controlling the performance of one or more of the available cores such as the first core 222, the second core 224 through to the N$^{th}$ core 230. The startup logic 250 may identify, load and execute a select context-aware program. An exemplary select program may be found in the program store 296 of the embedded file system 290 and is defined by a specific combination of a performance scaling algorithm 297 and a set of context parameters 298. The exemplary select program, when executed by one or more of the core processors in the CPU 110 may operate in accordance with one or more signals provided by the monitor module 114 in combination with control signals provided by the one or more context-aware module(s) 101 and DVFS module(s) 26 and scheduler 29 to allocate workloads and/or scale the performance of the respective processor core "up" or "down" to optimize QoS in view of the active environmental context. In this regard, the monitor module 114 may provide one or more indicators of events, processes, applications, resource status conditions, elapsed time, thermal factor states, context variable readings, etc.

The management logic 260 includes one or more executable instructions for terminating a context-aware program on one or more of the respective processor cores, as well as selectively identifying, loading, and executing a more suitable replacement program for managing or controlling the performance of one or more of the available cores. The management logic 260 is arranged to perform these functions at run time or while the PCD 100 is powered and in use by an operator of the device. A replacement program may be found in the program store 296 of the embedded file system 290 and, in some embodiments, may be defined by a specific combination of a performance scaling algorithm 297 and a set of context parameters 298.

The replacement program, when executed by one or more of the core processors in the digital signal processor may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc in response to control signals originating from the context-aware module 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the available bin settings for a given thermal aggressor.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 may be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal technique store 292. In this regard, the file system 290 may include a reserved section of its total file system capacity for the storage of information for the configuration and management of the various parameters 298 and thermal management algorithms 297 used by the PCD 100. As shown in FIG. 5, the store 292 includes a program store 296, which includes one or more thermal management programs that may include a context-aware thermal management program.

Figure 6:
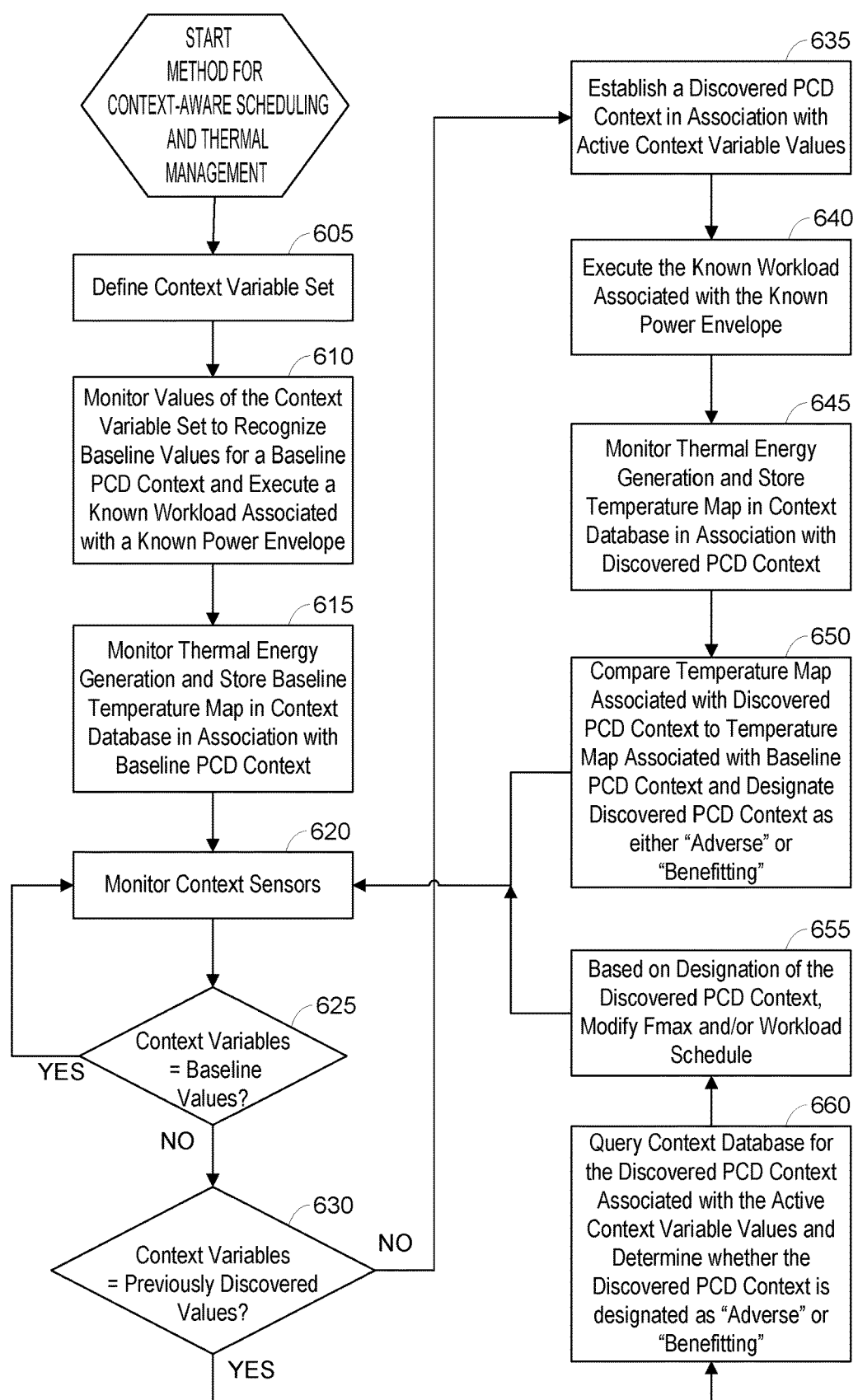
FIG. 6 is a logical flowchart illustrating a method for context-aware thermal management and workload scheduling in the PCD of FIG. 2.

FIG. 6 is a logical flowchart illustrating a method 600 for context-aware thermal management and workload scheduling in the PCD of FIG. 2. Beginning with block 605, a context variable set may be defined. As previously described, the context variable set may be any combination of variables useful for identifying and quantifying an environmental context to which the PCD may be exposed during operation. Notably, different environmental contexts may affect the relative efficiency of the PCD when dissipating excess thermal energy. As such, when exposed to one context, the PCD may be relatively more efficient in dissipating energy than when exposed to another context.

Returning to the method 600, at block 610 a baseline set of values or readings may be established for the context variable set and a known workload with a known power envelope executed subject to the baseline context variable settings. Subsequently, at block 615 thermal energy generated and dissipated by the PCD when the known workload is being processed while the PCD is subject to the baseline context variable readings may be monitored and measured. A baseline temperature map may be generated and stored in the context database 27 in association with the baseline context values.

With the baseline context established, at block 620 the context sensors may be monitored for any indication of an environmental context different from the baseline context. At decision block 625, so long as the context variable readings equal the baseline values, the "yes" branch is followed back to block 620 and the context sensors continue to be monitored as described above. So long as the context sensor readings do not indicate a change in the environmental context from the baseline context, then embodiments of the solution may dictate no modification or adjustment to active thermal management policies.

At decision block 625, if the context variable readings differ from the baseline values, the "no" branch is followed to decision block 630. At decision block 630, the method 600 determines whether the context variable readings are consistent with a combination of context variable readings previously discovered by the method 600. If the context variable readings are not consistent with a combination of context variable readings previously discovered by the method 600, the method continues to block 635.

At block 635, the method 600 establishes the active set of context variable readings as a newly discovered context and, at block 640, executes the known workload previously used to quantify the thermal performance of the PCD in association with the baseline context. At block 645, thermal energy generation is monitored using the various temperature sensors within the PCD to generate a thermal map. The thermal map may be stored in the context database in association with the newly discovered context variable reading combination. Subsequently, at block 650, the thermal map generated in connection with the newly discovered context variable reading combination when running the known workload is compared to the baseline thermal map previously generated in connection with the baseline context variable reading combination when running the known workload. Based on the comparison, the newly discovered context variable reading combination may be designated as either "beneficial" or "adverse" for thermal energy dissipation relative to the thermal energy dissipation efficiency associated with the baseline set of context variable readings. The method returns to block 620 and the context sensors are monitored.

Looping back down to decision block 630, if the context variable reading combination is consistent with a previously discovered context variable reading set (such as the discovered context described relative to blocks 635-650), the method 600 follows the "yes" branch to block 660. At block 660, the context database 27 may be queried to determine whether the thermal dissipation performance associated with the discovered context is "beneficial" or "adverse." At block 655, if the discovered context is associated with a beneficial thermal dissipation performance, then the context-aware module 101 may work with the scheduler 29 and/or DVFS module 26 to increase workload allocation and/or increase Fmax to one or more processing components. By contrast, if the discovered context is associated with an adverse thermal dissipation performance, then the context-aware module 101 may work with the scheduler 29 and/or DVFS module 26 to decrease/reallocate workloads and/or decrease Fmax to one or more processing components. In these ways, embodiments of the solution adjust thermal management policies in view of the thermal dissipation performance of a PCD as dictated by the environmental context in which the PCD is operating and, in so doing, optimize QoS experienced by a user. The method continues from block 655 back to block 620.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently" etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for context-aware thermal management in a portable computing device ("PCD"), the method comprising:
    defining a context variable set, wherein the context variable set is associated with an external environment to which the PCD is exposed;
    establishing baseline values for the context variable set, wherein the baseline values are associated with a baseline context;
    monitoring a set of context sensors to recognize the baseline values for the context variable set;
    in response to recognizing the baseline values, executing a known workload having a known power envelope;
    generating a baseline thermal map from temperature readings monitored using one or more temperature sensors during execution of the known workload;
    storing the baseline thermal map in association with the baseline values for the context variable set;
    monitoring the set of context sensors to recognize discovered values for the context variable set, wherein the discovered values are different from the baseline values;
    in response to recognizing the discovered values, executing the known workload;
    generating a discovered thermal map from temperature readings monitored using the one or more temperature sensors during execution of the known workload;
    comparing the discovered thermal map with the baseline thermal map to determine a designation of the discovered values for the context variable set as either a "beneficial" context if the discovered thermal map represents more efficient thermal energy dissipation than the baseline thermal map or an "adverse" context if the discovered thermal map represents less efficient thermal energy dissipation than the baseline thermal map, wherein the more efficient thermal energy dissipation comprises a higher thermal energy dissipation rate compared to a thermal energy dissipation rate associated with the baseline thermal map, and the less efficient thermal energy dissipation comprises a lower energy dissipation rate compared to the thermal energy dissipation rate associated with the baseline thermal map;
    storing in a database the discovered values for the context variable set in association with the determined designation;
    monitoring the set of context sensors to recognize a next occurrence of the discovered values, wherein the next occurrence of the discovered values is the same as discovered values stored in the database;
    in response to recognizing the next occurrence of the discovered values is the same as discovered values stored in the database, querying the database to retrieve from the database the designation associated with the discovered values stored in the database; and
    based on the designation, modifying a thermal management policy by adjusting a workload allocation among one or more processing components within the PCD; when the context designation is "adverse", then modifying the thermal management policy further by reducing a maximum frequency of the one or more processing components; and when the context designation is "beneficial", then modifying the thermal management policy further by increasing a maximum frequency of the one or more processing components.

2. The method of claim 1, wherein the context variable set comprises one or more of a physical orientation of the PCD, an ambient temperature, a humidity level, and contact with a surface external to the PCD.

3. The method of claim 1, wherein the thermal management policy is applied to one or more of a CPU, a GPU, a DSP and a modem.

4. The method of claim 1, further comprising:
    monitoring the set of context sensors to recognize second discovered values for the context variable set, wherein the second discovered values are different from the discovered values and the baseline values;
    in response to recognizing the second discovered values, executing the known workload;
    generating a second discovered thermal map from temperature readings monitored using the one or more temperature sensors during execution of the known workload;
    comparing the second discovered thermal map with the baseline thermal map to determine a designation of the second discovered values for the context variable set as either a "beneficial" context if the second discovered thermal map represents more efficient thermal energy dissipation than the baseline thermal map or an "adverse" context if the second discovered thermal map represents less efficient thermal energy dissipation than the baseline thermal map;

storing in the database the second discovered values for the context variable set in association with the determined designation;

monitoring the set of context sensors to recognize a next occurrence of the second discovered values, wherein the next occurrence of the second discovered values is the same as second discovered values stored in the database;

in response to recognizing the next occurrence of the second discovered values is the same as second discovered values stored in the database, querying the database to retrieve from the database the designation associated with the second discovered values stored in the database; and based on the designation associated with the second discovered values, modifying the thermal management policy.

5. The method of claim 1, wherein each context sensor comprises at least one of: a humidity sensor, an ambient temperature sensor, an orientation sensor, and a surface contact sensor.

6. The method of claim 1, wherein modifying the thermal management policy further comprises adjusting a power supply to one or more processing components.

7. The method of claim 1, wherein the database is stored in a memory device of a system-on-chip (SOC) within the portable computing device.

8. A computer system for context-aware thermal management in a portable computing device ("PCD"), the computer system comprising:

a processing system comprising one or more processors and one or more associated memories, the processing system configured to execute instructions defining a monitor module, a context-aware module, a scheduler and a dynamic voltage and frequency scaling module, collectively configured to:

define a context variable set, wherein the context variable set is associated with an external environment to which the PCD is exposed;

establish baseline values for the context variable set, wherein the baseline values are associated with a baseline context;

monitor a set of context sensors to recognize the baseline values for the context variable set;

in response to recognizing the baseline values, execute a known workload having a known power envelope;

generate a baseline thermal map from temperature readings monitored using one or more temperature sensors during execution of the known workload;

store the baseline thermal map in association with the baseline values for the context variable set;

monitor the set of context sensors to recognize discovered values for the context variable set, wherein the discovered values are different from the baseline values;

in response to recognizing the discovered values, execute the known workload;

generate a discovered thermal map from temperature readings monitored using the one or more temperature sensors during execution of the known workload;

compare the discovered thermal map with the baseline thermal map to determine a designation of the discovered values for the context variable set as either a "beneficial" context if the discovered thermal map represents more efficient thermal energy dissipation than the baseline thermal map or an "adverse" context if the discovered thermal map represents less efficient thermal energy dissipation than the baseline thermal map, wherein the more efficient thermal energy dissipation comprises a higher thermal energy dissipation rate compared to a thermal energy dissipation rate associated with the baseline thermal map, and the less efficient thermal energy dissipation comprises a lower energy dissipation rate compared to the thermal energy dissipation rate associated with the baseline thermal map;

store in a database the discovered values for the context variable set in association with the determined designation;

monitor the set of context sensors to recognize a next occurrence of the discovered values, wherein the next occurrence of the discovered values is the same as discovered values stored in the database;

in response to recognizing the next occurrence of the discovered values is the same as discovered values stored in the database, query the database to retrieve from the database the designation associated with the discovered values stored in the database; and based on the designation, modify a thermal management policy by adjusting a workload allocation among one or more processing components within the PCD; when the context designation is "adverse", then modify the thermal management policy further by reducing a maximum frequency of the one or more processing components; and when the context designation is "beneficial", then modify the thermal management policy further by increasing a maximum frequency of the one or more processing components.

9. The computer system of claim 8, wherein the context variable set comprises one or more of a physical orientation of the PCD, an ambient temperature, a humidity level, and contact with a surface external to the PCD.

10. The computer system of claim 8, wherein the thermal management policy is applied to one or more of a CPU, a GPU, a DSP and a modem.

11. The computer system of claim 8, wherein the monitor module, context-aware module, scheduler and dynamic voltage and frequency scaling module are further collectively configured to:

monitor the set of context sensors to recognize second discovered values for the context variable set, wherein the second discovered values are different from the discovered values and the baseline values;

in response to recognizing the second discovered values, execute the known workload;

generate a second discovered thermal map from temperature readings monitored using the one or more temperature sensors during execution of the known workload;

compare the second discovered thermal map with the baseline thermal map to determine a designation of the second discovered values for the context variable set as either a "beneficial" context if the second discovered thermal map represents more efficient thermal energy dissipation than the baseline thermal map or an "adverse" context it the second discovered thermal map represents less efficient thermal energy dissipation than the baseline thermal map;

store in the database the second discovered values for the context variable set in association with the determined designation;

monitor the set of context sensors to recognize a next occurrence of the second discovered values, wherein the next occurrence of the discovered values is the same as second discovered values stored in the database;

in response to recognizing the next occurrence of the second discovered values is the same as second discovered values stored in the database, query the database to retrieve from the database the designation associated with the second discovered values stored in the database; and based on the designation associated with the second discovered values, modify the thermal management policy.

12. The computer system of claim 8, wherein the portable computing device is in the form of a wireless telephone.

13. The computer system of claim 8, wherein each context sensor comprises at least one of: a humidity sensor, an ambient temperature sensor, an orientation sensor, and a surface contact sensor.

14. The computer system of claim 8, wherein modifying the thermal management policy further comprises adjusting a power supply to one or more processing components.

15. The computer system of claim 8, wherein the database is stored in a memory device of a system-on-chip (SOC) within the portable computing device.

16. A system for context-aware thermal management in a portable computing device ("PCD"), the system comprising:

means for defining a context variable set, wherein the context variable set is associated with an external environment to which the PCD is exposed;

means for establishing baseline values for the context variable set, wherein the baseline values are associated with a baseline context;

means for monitoring a set of context sensors to recognize the baseline values for the context variable set;

means for executing a known workload having a known power envelope in response to recognizing the baseline values;

means for generating a baseline thermal map from temperature readings monitored using one or more temperature sensors during execution of the known workload;

means for storing the baseline thermal map in association with the baseline values for the context variable set;

means for monitoring the set of context sensors to recognize discovered values for the context variable set, wherein the discovered values are different from the baseline values;

means for executing the known workload in response to recognizing the discovered values;

means for generating a discovered thermal map from temperature readings monitored using the one or more temperature sensors during execution of the known workload;

means for comparing the discovered thermal map with the baseline thermal map to determine a designation of the discovered values for the context variable set as either a "beneficial" context if the discovered thermal map represents more efficient thermal energy dissipation than the baseline thermal map or an "adverse" context if the discovered thermal map represents less efficient thermal energy dissipation than the baseline thermal map, wherein the more efficient thermal energy dissipation comprises a higher thermal energy dissipation rate compared to a thermal energy dissipation rate associated with the baseline thermal map, and the less efficient thermal energy dissipation comprises a lower energy dissipation rate compared to the thermal energy dissipation rate associated with the baseline thermal map;

means for storing in a database the discovered values for the context variable set in association with the determined designation;

means for monitoring the set of context sensors to recognize a next occurrence of the discovered values, wherein the next occurrence of the discovered values is the same as discovered values stored in the database;

means for querying the database to retrieve from the database the designation associated with the discovered values in response to recognizing the next occurrence of the discovered values is the same as discovered values stored in the database; and means for modifying a thermal management policy based on the designation, the means for modifying adjusting a workload allocation among one or more processing components within the PCD; when the context designation is "adverse", then the means for modifying further reduces a maximum frequency of the one or more processing components; and when the context designation is "beneficial", then the means for modifying further increasing a maximum frequency of the one or more processing components.

17. The system of claim 16, wherein the context variable set comprises one or more of a physical orientation of the PCD, an ambient temperature, a humidity level, and contact with a surface external to the PCD.

18. The system of claim 16, wherein the thermal management policy is applied to one or more of a CPU, a GPU, a DSP and a modem.

19. The system of claim 16, further comprising:

means for monitoring the set of context sensors to recognize second discovered values for the context variable set, wherein the second discovered values are different from the discovered values and the baseline values;

means for executing the known workload in response to recognizing the second discovered values;

means for generating a second discovered thermal map from temperature readings monitored using the one or more temperature sensors during execution of the known workload;

means for comparing the second discovered thermal map with the baseline thermal map to determine a designation of the second discovered values for the context variable set as either a "beneficial" context if the second discovered thermal map represents more efficient thermal energy dissipation than the baseline thermal map or an "adverse" context if the second discovered thermal map represents less efficient thermal energy dissipation than the baseline thermal map;

means for storing in a database the second discovered values for the context variable set in association with the determined designation;

means for monitoring the set of context sensors to recognize a next occurrence of the second discovered values, wherein the next occurrence of the second discovered values is the same as second discovered values stored in the database;

means for querying the database to retrieve from the database the designation associated with the second discovered values in response to recognizing the next occurrence of the second discovered values is the same as second discovered values stored in the database; and means for modifying the thermal management policy based on the designation associated with the second discovered values.

20. The system of claim 16, wherein the portable computing device is in the form of a wireless telephone.

21. The system of claim 16, wherein the means for modifying the thermal management policy further comprises means for adjusting a power supply to one or more processing components.

22. The system of claim 16, wherein the database is stored in a memory device of a system-on-chip (SOC) within the portable computing device.

23. The system of claim 16, wherein each context sensor comprises at least one of: a humidity sensor, an ambient temperature sensor, an orientation sensor, and a surface contact sensor.

24. A computer program product comprising a computer usable device having a computer readable program code embodied therein, said computer readable program code adapted to be executed to implement a method for context-aware thermal management in a portable computing device ("PCD"), said method comprising:

defining a context variable set, wherein the context variable set is associated with an external environment to which the PCD is exposed;

establishing baseline values for the context variable set, wherein the baseline values are associated with a baseline context;

monitoring a set of context sensors to recognize the baseline values for the context variable set;

in response to recognizing the baseline values, executing a known workload having a known power envelope;

generating a baseline thermal map from temperature readings monitored using one or more temperature sensors during execution of the known workload;

storing the baseline thermal map in association with the baseline values for the context variable set;

monitoring the set of context sensors to recognize discovered values for the context variable set, wherein the discovered values are different from the baseline values;

in response to recognizing the discovered values, executing the known workload;

generating a discovered thermal map from temperature readings monitored using the one or more temperature sensors during execution of the known workload;

comparing the discovered thermal map with the baseline thermal map to determine a designation of the discovered values for the context variable set as either a "beneficial" context if the discovered thermal map represents more efficient thermal energy dissipation than the baseline thermal map or an "adverse" context if the discovered thermal map represents less efficient thermal energy dissipation than the baseline thermal map, wherein the more efficient thermal energy dissipation comprises a higher thermal energy dissipation rate compared to a thermal energy dissipation rate associated with the baseline thermal map, and the less efficient thermal energy dissipation comprises a lower energy dissipation rate compared to the thermal energy dissipation rate associated with the baseline thermal map;

storing in a database the discovered values for the context variable set in association with the determined designation;

monitoring the set of context sensors to recognize a next occurrence of the discovered values, wherein the next occurrence of the discovered values is the same as discovered values stored in the database;

in response to recognizing the next occurrence of the discovered values is the same as discovered values stored in the database, querying the database to retrieve from the database the designation associated with the discovered values stored in the database; and based on the designation, modifying a thermal management policy by adjusting a workload allocation among one or more processing components within the PCD; when the context designation is "adverse", then modify the thermal management policy further by reducing a maximum frequency of the one or more processing components; and when the context designation is "beneficial", then modify the thermal management policy further by increasing a maximum frequency of the one or more processing components.

25. The computer program product of claim 24, wherein the context variable set comprises one or more of a physical orientation of the PCD, an ambient temperature, a humidity level, and contact with a surface external to the PCD.

26. The computer program product of claim 24, wherein the thermal management policy is applied to one or more of a CPU, a GPU, a DSP and a modem.

27. The computer program product of claim 24, wherein the method further comprises:

monitoring the set of context sensors to recognize second discovered values for the context variable set, wherein the second discovered values are different from the discovered values and the baseline values;

in response to recognizing the second discovered values, executing the known workload;

generating a second discovered thermal map from temperature readings monitored using the one or more temperature sensors during execution of the known workload;

comparing the second discovered thermal map with the baseline thermal map to determine a designation of the second discovered values for the context variable set as either a "beneficial" context if the second discovered thermal map represents more efficient thermal energy dissipation than the baseline thermal map or an "adverse" context if the second discovered thermal map represents less efficient thermal energy dissipation than the baseline thermal map;

storing in a database the second discovered values for the context variable set in association with the determined designation;

monitoring the set of context sensors to recognize a next occurrence of the second discovered values, wherein the next occurrence of the second discovered values is the same as second discovered values stored in the database;

in response to recognizing the next occurrence of the second discovered values is the same as second discovered values stored in the database, querying the database to retrieve from the database the designation associated with the second discovered values stored in the database; and based on the designation associated with the second discovered values, modifying the thermal management policy.

28. The computer program product of claim 24, wherein each context sensor comprises at least one of: a humidity sensor, an ambient temperature sensor, an orientation sensor, and a surface contact sensor.

29. The computer program product of claim 24, wherein modifying the thermal management policy further comprises adjusting a power supply to one or more processing components.

30. The computer program product of claim 24, wherein the database is stored in a memory device of a system-on-chip (SOC) within the portable computing device.

\* \* \* \* \*